US011175857B2

(12) United States Patent
Koseki et al.

(10) Patent No.: US 11,175,857 B2
(45) Date of Patent: Nov. 16, 2021

(54) STORAGE DEVICE AND STORAGE MANAGEMENT METHOD

(71) Applicant: Hitachi, Ltd., Tokyo (JP)

(72) Inventors: Hideyuki Koseki, Tokyo (JP); Shugo Ogawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/805,934

(22) Filed: Mar. 2, 2020

(65) Prior Publication Data

US 2021/0011659 A1  Jan. 14, 2021

(30) Foreign Application Priority Data

Jul. 12, 2019  (JP) .............................. JP2019-129860

(51) Int. Cl.
*G06F 3/06* (2006.01)
*G06F 11/10* (2006.01)

(52) U.S. Cl.
CPC .......... *G06F 3/0659* (2013.01); *G06F 3/0616* (2013.01); *G06F 3/0619* (2013.01); *G06F 3/0653* (2013.01); *G06F 3/0689* (2013.01); *G06F 11/1076* (2013.01)

(58) Field of Classification Search
None
See application file for complete search history.

(56) References Cited

U.S. PATENT DOCUMENTS

| 2008/0010499 | A1* | 1/2008 | Vingralek | ............. G06F 11/008 714/6.11 |
| 2008/0109601 | A1* | 5/2008 | Klemm | ................. G06F 3/0689 711/114 |
| 2018/0196755 | A1* | 7/2018 | Kusuno | ............... G06F 12/0246 |

FOREIGN PATENT DOCUMENTS

| JP | 2009-538482 A | 11/2009 |
| WO | WO 2007/140260 A2 | 12/2007 |

\* cited by examiner

*Primary Examiner* — Michael Alsip
(74) *Attorney, Agent, or Firm* — Baker Botts L.L.P.

(57) ABSTRACT

To provide a storage device by which distribution of data to an added memory device may be carried out in a short period of time.
In a case where any new SSD is added to the storage device, a storage controller carries out first data distribution processing moving any piece of user data in a parity group from existing SSDs to the added SSD and second data distribution processing increasing the number of pieces of the user data configuring the parity group from a first number to a second number after the first data distribution processing and storing the user data in a plurality of memory devices SSDs.

6 Claims, 16 Drawing Sheets

FIG.4
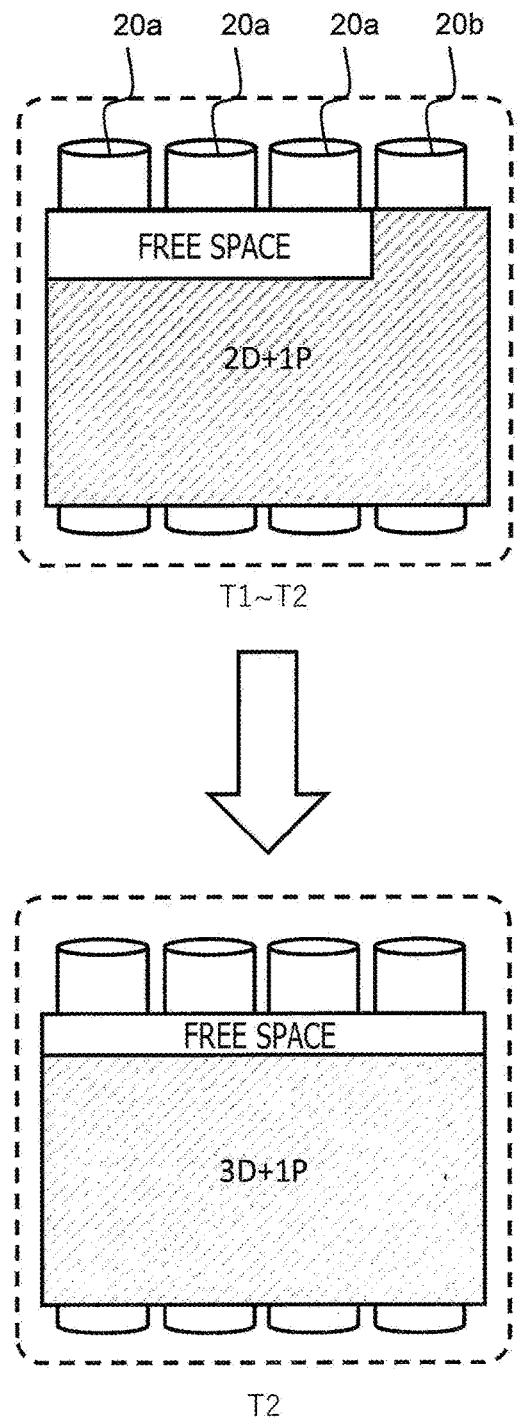
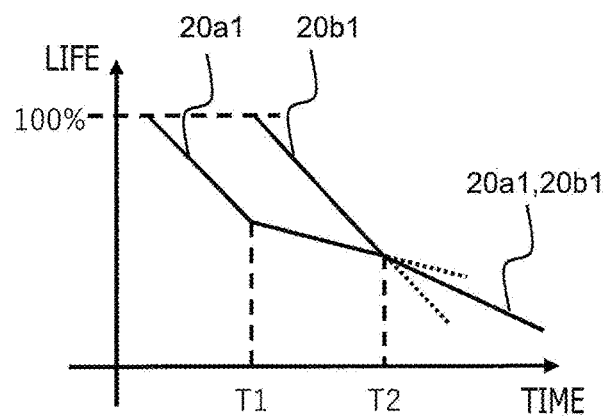

FIG. 5

| VIRTUAL VOLUME MANAGEMENT TABLE 500 | | | | | |
|---|---|---|---|---|---|
| VIRTUAL VOLUME ID 501 | UDBID 502 | EXTENT ID 503 | ENTRY ID 504 | OFFSET 505 | Length 506 |
| 0 | 0 | 100 | 00 | 0 | 4KB |
|   | 1 | 2 | 23 | 24KB | 8KB |
|   | ... | ... | ... | ... | ... |
|   | N | ... | ... | ... | ... |
| 1 | ... | ... | ... | ... | ... |
|   | ... | ... | ... | ... | ... |

FIG.6

EXTENT CONFIGURATION MANAGEMENT TABLE ~510

| EXTENT ID ~511 | RAID CONFIGURATION ~512 | ENTRY ID ~513 | ATTRIBUTE ~514 | SSDID ~515 | SSD BLOCK ID ~516 |
|---|---|---|---|---|---|
| 0 | 2D+1P+1S | 00 | Data | SSD ID01 | D00 |
|   |   | 01 | Data | SSD ID02 | D00 |
|   |   | 02 | Unused | N/A | N/A |
|   |   | . . . | . . . | N/A | N/A |
|   |   | 0M | Parity | SSD ID03 | D00 |
|   |   | 0N | Spare | SSD ID04 | D00 |
|   |   | 10 | Data | SSD ID01 | D01 |
|   |   | 11 | Data | SSD ID02 | D02 |
|   |   | 12 | Unused | N/A | N/A |
|   |   | . . . | . . . | N/A | N/A |
|   |   | 1M | Parity | SSD ID03 | D01 |
|   |   | 1N | Spare | SSD ID04 | D03 |
|   |   | . . . | . . . | . . . | . . . |
| ... | ... | ... | ... | ... | ... |

FIG.7

| EXTENT STATE MANAGEMENT TABLE | | | | | |
|---|---|---|---|---|---|
| EXTENT ID | RAID CONFIGURATION | STATE | NEXT ENTRY ID | OFFSET | DATA DISTRIBUTION STATE |
| 0 | 2D+1P+1S | OPEN | 02 | 12KB | FIRST ORDER |
| 1 | 2D+1P+1S | CLOSE | N/A | N/A | FIRST ORDER |
| 2 | N/A | EMPTY | N/A | N/A | N/A |
| ... | ... | ... | ... | ... | |
| | | | | | |
| | | | | | |

FIG.8

| PG MANAGEMENT TABLE 530 | | |
| --- | --- | --- |
| PGID 531 | SSDID 532 | DATA DISTRIBUTION STATE 533 |
| 0 | 0 | FIRST ORDER |
| | 1 | |
| | 2 | |
| | ... | |
| | N | |
| ... | ... | ... |

FIG.9

| SSD BLOCK MANAGEMENT TABLE 540 | | | | |
|---|---|---|---|---|
| SSDID 541 | SSD BLOCK ID 542 | STATE 543 | EXTENT ID 544 | ENTRY ID 545 |
| 0 | 0 | ASSIGNED | 100 | 20 |
| | 1 | UNASSIGNED | N/A | N/A |
| | 2 | ASSIGNED | 20 | 00 |
| | ... | ... | ... | ... |
| | N | UNASSIGNED | N/A | N/A |
| ... | ... | ... | ... | ... |

FIG.10

| | | | | | | |550|
|---|---|---|---|---|---|---|---|
| LIFE STATISTICS TABLE | | | | | | | |
| 551 | 552 | 553 | 554 | 555 | 556 | 557 | |
| SSDID | DURATION OF USE | DATA STORAGE RATIO | REMAINING LIFE | DATA VOLUME | ACTUAL AMOUNT OF WRITING | LIFE CONSUMPTION RATE | |
| 0 | 0.1 YEARS | 10% | 99% | 100GB | 100GB | 1 | |
| | 0.2 YEARS | 15% | 98% | 100GB | 100GB | 1 | |
| | 0.3 YEARS | 30% | 90% | 100GB | 100GB | 1 | |
| | ... | ... | ... | ... | ... | ... | |
| | ... | ... | ... | ... | ... | ... | |
| | 3.0 YEARS | 85% | 50% | 100GB | 300GB | 3 | |
| ... | ... | ... | ... | ... | ... | ... | |
| ... | ... | ... | ... | ... | ... | ... | |

STORAGE DEVICE AND STORAGE MANAGEMENT METHOD

BACKGROUND OF THE INVENTION

1. Field of the Invention

The present disclosure relates to a storage device and a storage management method.

2. Description of the Related Art

Among storage devices with use of redundant array of independent (or inexpensive) disks (RAID) system in which a plurality of memory devices to store data are used as one virtual memory device, storage devices in which solid state drives (SSDs) are used as the memory devices have been put into practical use. In the SSD, however, increasing in storage ratio (capacity usage rate) for data results in decrease in efficiency of garbage collection for release of unnecessary memory region, and a phenomenon called write amplification, which means increase in amount of writing as data volume written into a memory device in comparison with actual data volume, may occur. The SSD, of which a remaining life is fixed in accordance with the amount of writing, has a problem in that occurrence of the write amplification increases a consumption rate at which the remaining life is consumed.

As for the problem, JP-2009-538482-T discloses a technique in which the consumption rate for the remaining life may be decreased by decrease in the storage ratio for data through addition of a memory device. In the technique, data distributed among existing memory devices is restructured in order to be distributed among the existing memory devices and the added memory device, when the memory device is added, and the restructured data is distributed among and stored in the existing memory devices and the added memory device.

SUMMARY OF THE INVENTION

The technique disclosed in JP-2009-538482-T, which makes restructuring of the data essential when the memory device is added, has a problem in that taking a long time for distribution of the data may inhibit prompt decrease in the consumption rate for the remaining life.

It is desirable to provide a storage device and a storage management method by which the distribution of the data to the added memory device may be carried out in a short period of time.

A storage device according to one aspect of the present disclosure is a storage device which includes a control unit and a plurality of memory devices, in which a parity group is configured by including a first number of pieces of user data and redundant data generated from the first number of pieces of the user data, in which the user data and the redundant data in the parity group are stored in the different memory devices from each other, and in which, in a case where any new memory device is added to the storage device, the control unit carries out first data distribution processing moving any piece of the user data in the parity group from the existing memory devices to the added memory device and second data distribution processing increasing the number of pieces of the user data configuring the parity group from the first number to a second number after the first data distribution processing, and storing the resultant user data in the plurality of memory devices.

According to the present invention, distribution of data to the added memory device may be carried out in a short period of time.

BRIEF DESCRIPTION OF THE DRAWINGS

FIG. 4 is a diagram for description of second-order distribution;

FIG. 5 is a diagram illustrating an example of a virtual volume management table;

FIG. 6 is a diagram illustrating an example of an extent configuration management table;

FIG. 7 is a diagram illustrating an example of an extent state management table;

FIG. 8 is a diagram illustrating an example of a PG management table;

FIG. 9 is a diagram illustrating an example of an SSD block management table;

FIG. 10 is a diagram illustrating an example of a life statistics table;

DESCRIPTION OF THE PREFERRED EMBODIMENTS

Hereinbelow, an embodiment of the present disclosure will be described with reference to the drawings.

Figure 1:
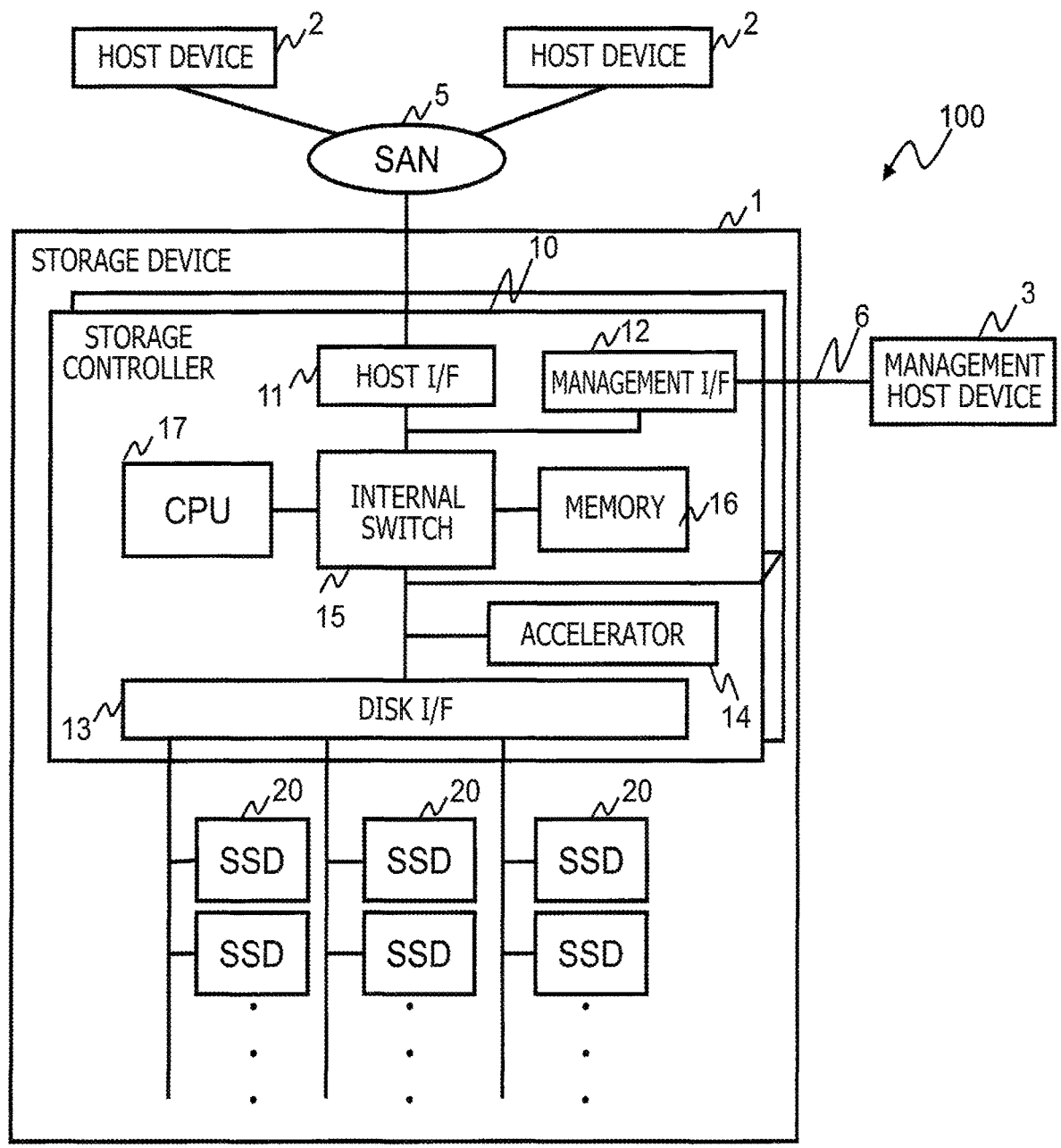
FIG. 1 is a diagram illustrating a computer system in accordance with an embodiment of the present disclosure.

FIG. 1 is a diagram illustrating a computer system in accordance with the embodiment of the present disclosure. The computer system 100 illustrated in FIG. 1 includes a storage device 1, host devices 2, and a management host device 3. In an example of the drawing, the storage device 1 and the host devices 2 are connected to each other through storage area network (SAN) 5 so as to be mutually communicable. The storage device 1 and the management host device 3 are connected to each other through local area network (LAN) 6 so as to be mutually communicable.

The storage device 1 stores data with use of RAID system. The host devices 2 are higher-level devices that request write and read of data (user data) to and from the storage device 1. Though the two host devices 2 are illustrated in FIG. 1, the number of the host devices 2 is not limited to two and may be one or three or more. The management host device 3 is a management device that manages the storage device 1. The management host device 3 receives various notifications from the storage device 1 and transmits various instructions to the storage device 1.

The storage device 1 includes a storage controller 10 and a plurality of SSDs 20.

The storage controller 10 is a control unit that controls read and write of data from and into the SSDs 20. Though the storage controller 10 is duplicated, in the example of the drawing, in order that reliability may be improved by preparation of replicas of data to be read and written, the storage controller 10 may not be duplicated or may be triplicated or further multiplexed.

The storage controller 10 includes a host interface (I/F) 11, a management I/F 12, a disk I/F 13, an accelerator 14, an internal switch 15, a memory 16, and a central processing unit (CPU) 17.

The host I/F 11 communicates with the host devices 2. The management I/F 12 communicates with the management host device 3. The disk I/F 13 communicates with the SSDs 20. The accelerator 14 carries out data reduction processing for reduction in data volume of data to be written into the SSDs 20. As the data reduction processing, compression processing for compression of the data, deduplication processing for exclusion of duplicate data, and the like may be enumerated. Though the accelerator 14 is implemented by dedicated hardware in the example of the drawing, the accelerator 14 may be implemented by software. The internal switch 15 switches connections among units of the storage controller 10.

The memory 16 temporarily stores data to be read from or written into the SSDs 20. Management information for management of the storage device 1 and a program that regulates actions of the CPU 17 are recorded in the memory 16. The CPU 17 is a computer that reads the program recorded in the memory 16 and that implements various functions by executing the read program.

The SSDs 20 are memory devices to store data and may be referred to as flash memory drives. The SSDs 20 configure a RAID system that stores data in a distributed state. Though all flash arrays (AFA) in which all memory devices are configured as SSDs are used in the example of the drawing, hybrid arrays in which SSDs and hard disk drives (HDDs) are mixed may be used. In addition, storage class memories (SCMs) may be used in place of SSDs and SSDs and SCMs may be mixed. SSDs, SCMs, and the like have lives based on amounts of writing.

Figure 2:
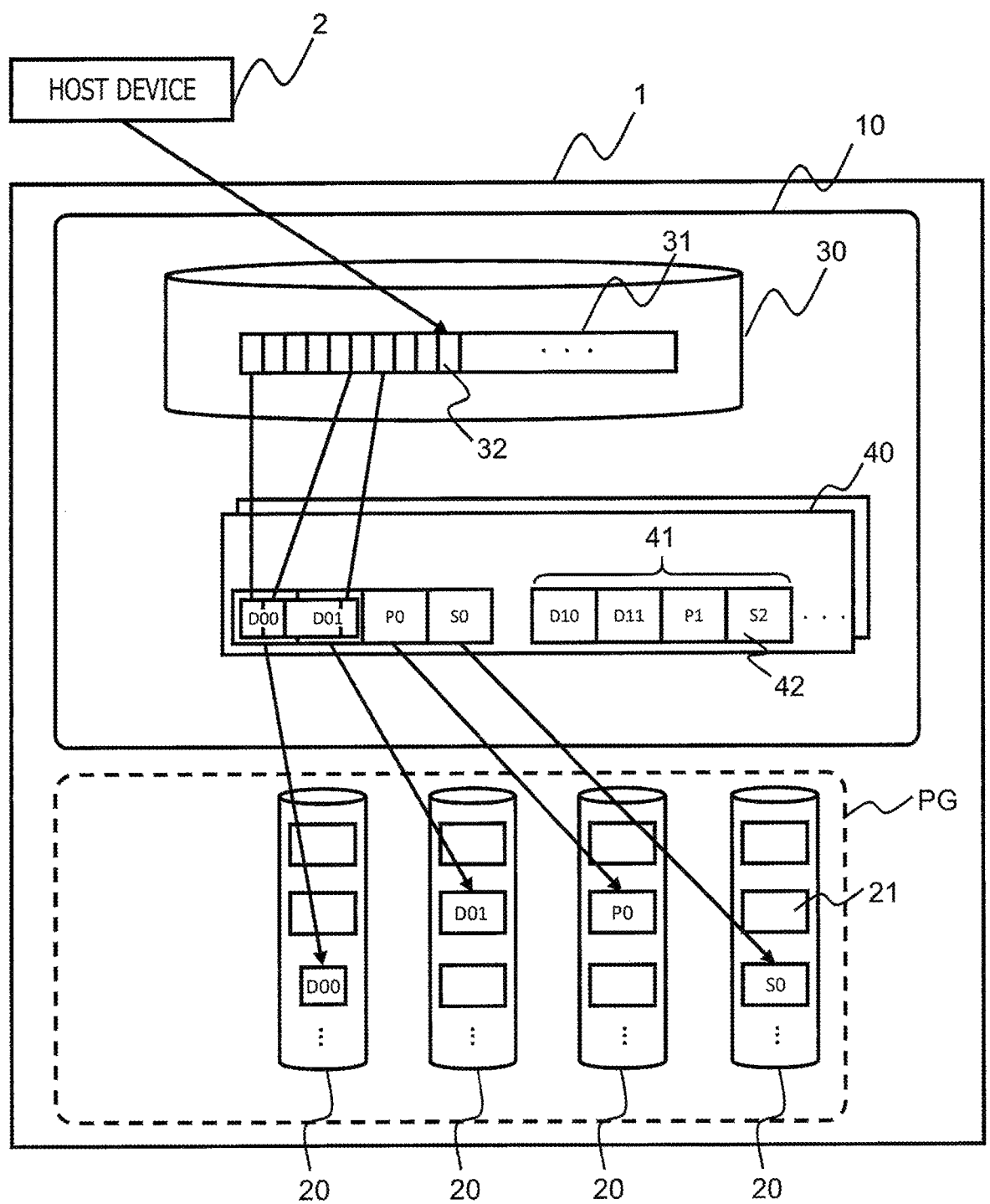
FIG. 2 is a diagram for description of an example of processing for writing data into SSDs.

FIG. 2 is a diagram for description of an example of write processing for writing data into the SSDs 20. In the embodiment, the storage controller 10 makes use of log structure scheme in which data is sequentially written into the SSDs 20 in a recordable manner.

The storage controller 10 provides the host device 2 with a virtual volume 30 that is a virtual storage area. A virtual address space 31 of the virtual volume 30 is partitioned into user data blocks (UDBs) 32 each having a fixed size (8 KB, for instance).

The storage controller 10 manages the plurality of SSDs 20 by grouping the SSDs 20 into one or a plurality of parity groups PGs and manages memory areas of the SSDs 20 based on a unit referred to as SSD block 21. The parity group PG is a memory device group including a plurality of SSDs 20 and may be referred to as RAID group as well. In the example of FIG. 2, a RAID configuration of each parity group PG is 2D+1P+1S. Here, D denotes SSD 20 in which user data for which write request is made by the host device 2 is stored. P denotes SSD 20 in which redundant data (parity data) generated from the user data that is stored. S denotes SSD 20 which is reserved as spare (backup). Numerals preceding D, P, and S each indicate the number of the SSDs. That is, 2D+1P+1S means that four SSDs 20 configure one parity group PG, that two SSDs 20 among the four SSDs 20 store the user data, that one SSD 20 among the same stores the redundant data, and that one SSD 20 among the same is reserved as a spare. Note that, the RAID configuration of the parity group PG is not limited to the above example and may be modified appropriately. A group including a plurality of pieces of the user data and the redundant data generated from the plurality of pieces of the user data may be referred to as parity group.

The storage controller 10 manages a recording area of the memory 16 based on a unit referred to as extent 40. The extent 40 is made to correspond to the user data block 32 and to the SSD block 21. Specifically, the extent 40 includes a plurality of stripe rows 41 each of which is a data unit for storage of data into a plurality of SSDs 20 in a distributed state. The stripe rows 41 each include a plurality of entries 42 that are made to correspond to the SSD blocks 21. The entries 42 each have any of a data area for recording the user data, a parity area for recording the redundant data, and a spare area to be reserved as a spare, as an attribute, in accordance with the RAID configuration of the parity group PG.

For storing the user data in the storage device 1, the host device 2 transmits the write request for the virtual volume 30 provided from the storage controller 10, to the storage device 1. The write request indicates the user data to be stored in the storage device 1 and information regarding location in the virtual volume 30 into which the user data is to be written.

Upon reception at the host I/F 11 of the write request from the host device 2, the storage controller 10 records the user data indicated by the write request, in the extent 40 linked to the user data block 32 corresponding to a virtual address. Specifically, the storage controller 10 records the user data in the recordable manner in the entries 42 which are included in each stripe row 41 in the extent 40 and of which the attribute is the data area.

Each time the storage controller 10 records the user data for one stripe row 41, that is, each time the storage controller 10 records the user data in all the entries 42 of the data area included in the stripe row 41, the storage controller 10 generates the redundant data from the user data and records the redundant data in the entry 42 of the parity area. Then the storage controller 10 stores the user data and the redundant data in the SSD blocks 21 corresponding to the entries 42 in which the user data and the redundant data are recorded, so that the user data and the redundant data may be distributed among and may be stored in the plurality of SSDs 20.

The SSDs 20 that store the user data and the redundant data may be different for each stripe row 41 or may be fixed. The SSD 20 that is reserved as the spare may be different for each stripe row 41 or may be fixed.

Figure 3:
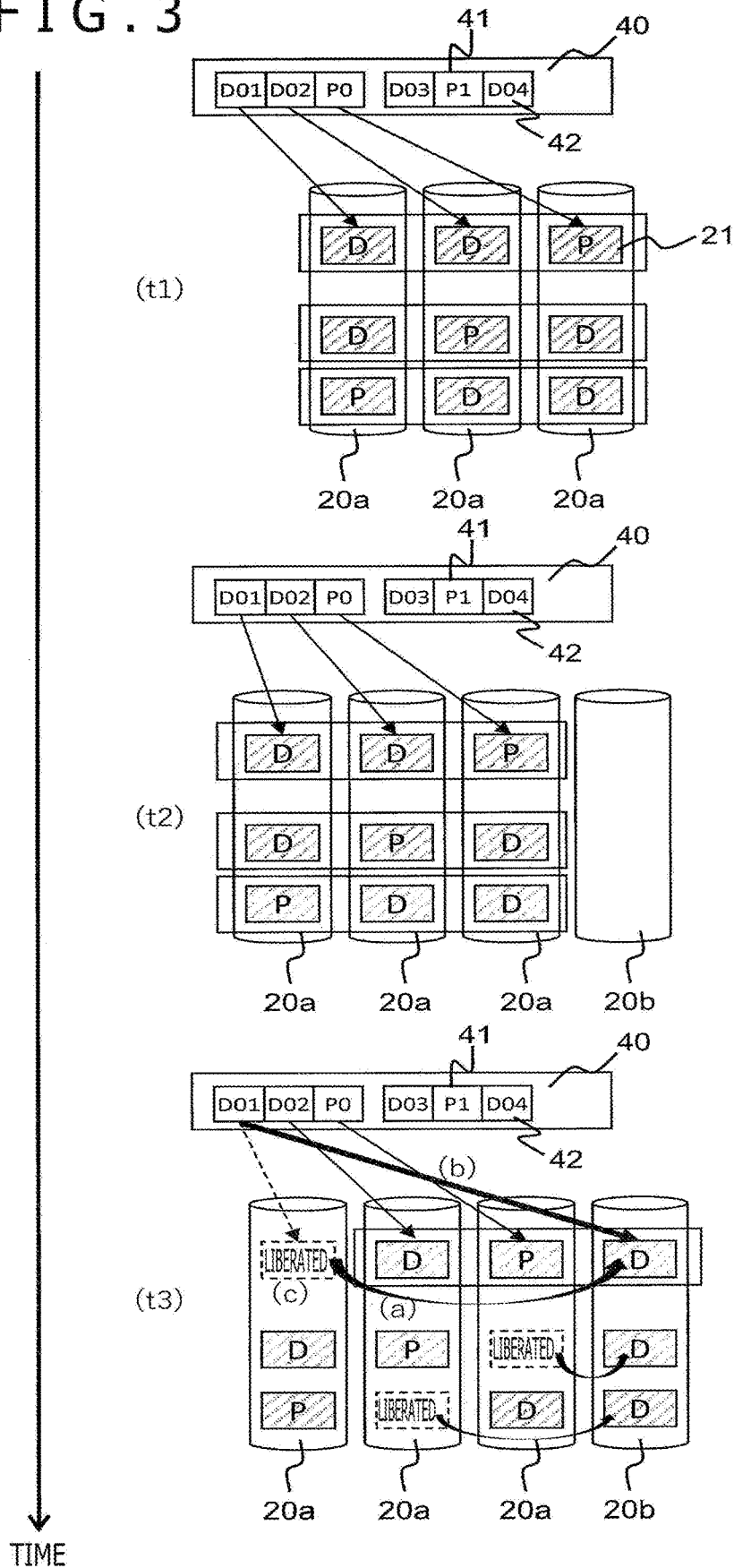
FIG. 3 is a diagram for description of an example of processing at the time when an SSD is newly provided.

FIG. 3 is a diagram for description of an example of processing at the time when an SSD 20 is newly provided and added to the parity group PG.

In FIG. 3, the RAID configuration of the parity group PG in a state t1 before new provision of the SSD 20 is 2D+1P. The SSDs 20 included in the parity group PG in the state t1 are referred to as existing SSDs 20a. It is assumed that the one SSD 20 is thereafter provided newly and added to the parity group PG. In a state t2 immediately after addition, no data has been stored in the added SSD 20b.

In a state t3 after the addition of the SSD 20, the storage controller 10 carries out first data distribution processing in which data stored in the SSD block 21 corresponding to any of the entries 42 in each stripe row 41 in the extent 40 is moved to an SSD block 21 in the added SSD 20b. Movement of the data is carried out through (a) copying of the data stored in the source SSD block 21 into the SSD block 21 in the added SSD 20*b*, (b) update of correspondence between the extent 40 and the SSD blocks 21, and (c) liberation of the source SSD block 21, for instance.

It is then desirable for the storage controller 10 to move the user data and not to move the redundant data. The storage controller 10 may move the data while periodically changing the source SSD 20*a* for each stripe row 41 so that the number of liberated SSD blocks 21 in each of the SSDs 20 may be equalized, for instance.

In the state t3, the RAID configuration in the physical parity group PG becomes 3D+1P, while the RAID configuration on the logical extent 40 remains 2D+1P adopted before the addition of the SSD 20. Therefore, the data may be distributed among both of the SSDs 20*a* that are the existing SSDs 20 and the SSD 20*b* that is the added SSD 20, without restructuring of the data such as repartition of the data or regeneration of the redundant data.

Hereinbelow, a state (transition from the state t1 to the state t3) in which only the physical RAID configuration has been changed with the logical RAID configuration maintained will be referred to as first-order distribution. At specified timing after attainment of the first-order distribution, the storage controller 10 restructures the data stored in the existing SSDs 20*a* and the added SSD 20*b*, newly distributes the data among the existing SSDs 20*a* and the added SSD 20*b*, and changes the logical RAID configuration of the SSDs 20 in the extent 40 into 3D+1P, though not illustrated in FIG. 3. A state in which transition of the logical RAID configuration and the physical RAID configuration into the same configuration has been made again after the attainment of the first-order distribution is referred to as second-order distribution.

FIG. 4 is a diagram for description of timing at which the second-order distribution is carried out.

As illustrated on a right side in FIG. 4, a portion of the data stored in the existing SSDs 20*a* is moved to the added SSD 20*b* at the time T1 when the first-order distribution is carried out. Then any of the SSD blocks 21 in the existing SSDs 20*a* is liberated for each stripe row 41 and thus the storage ratio for the data in the added SSD 20*b* becomes higher than the storage ratio for the data in the existing SSDs 20*a*. Therefore, the consumption rate for a remaining life 20*b*1 of the added SSD 20*b* becomes greater than the consumption rate for a remaining life 20*a*1 of the existing SSDs 20*a*.

Accordingly, a difference between the remaining life 20*b*1 of the added SSD 20*b* and the remaining life 20*a*1 of the existing SSDs 20*a* decreases with time. The storage controller 10 carries out the second-order distribution by carrying out the second data distribution processing in which the number of pieces of the user data configuring the parity group is increased at the time T2 when the life difference resulting from subtraction of the remaining life 20*a*1 of the existing SSDs 20*a* from the remaining life 20*b*1 of the added SSD 20*b* is obliterated and thereby changes the RAID configuration into 3D+1P. Even though the life difference is not obliterated, it is sufficient if timing of start of the second data distribution processing is determined based on the life difference. For instance, the storage controller 10 may carry out the second-order distribution on condition that the life difference reaches a threshold. In the second data distribution processing, it is sufficient if the number of pieces of the user data is increased from a first number to a second number greater than the first number. Then, a data volume of the redundant data with respect to the user data is decreased.

In a case where the write request is received between the attainment of the first-order distribution and the time T2, the storage controller 10 may distribute and store the user data that is the data for which the write request is made, among and in the three SSDs 20 with setting of the RAID configuration as 2D+1P or may distribute the user data among the four SSDs 20 with setting of the RAID configuration as 3D+1P. Here, the RAID configuration is set to be 2D+1P in a case where the write request is received between the attainment of the first-order distribution and the time T2. In this case, it is sufficient if the three SSDs 20 that store the user data are selected from among the existing SSDs 20*a* and the added SSD 20*b*.

Though the remaining lives linearly decrease with the time in the example of FIG. 4, the remaining lives do not necessarily exhibit linear decrease with the time. Though the remaining life 20*b*1 of the SSD 20*b* coincides with the remaining life 20*a*1 of the existing SSDs 20*a* at and after the time T2, the lives do not necessarily coincide.

Though the RAID configuration before the new provision is 2D+1P in the examples of FIGS. 3 and 4, the RAID configuration is not limited to the examples. For instance, the RAID configuration may be a RAID configuration including spare (nD+1P+1S, for instance). In this case, it is desirable for the source SSD block 21 for the data in the first-order distribution to be selected from among the SSD blocks 21 that differ from the SSD block 21 in the SSD 20 reserved as the spare.

Hereinbelow, the present disclosure will be described in more detail.

FIGS. 5 through 10 are diagrams illustrating an example of the management information recorded in the memory 16. Though the management information is expressed as various tables in a description below, the management information may be expressed with use of any data structure. In the description below, a configuration of each of the tables is an example, and one table may be partitioned into two or more tables or entirety or portions of two or more tables may form one table.

FIG. 5 illustrates a virtual volume management table that is the management information for management of the virtual volumes 30. The virtual volume management table 500 illustrated in FIG. 5 includes virtual volume IDs 501 for identification of the virtual volumes 30, UDBIDs 502 for identification of the user data blocks 32 that are included in the virtual volume IDs 501, extent IDs 503 for identification of the extents 40 corresponding to the user data blocks 32, entry IDs 504 for identification of the entries 42 corresponding to the user data blocks 32, offsets 505 that are offset values from first logical addresses of the entries 42 in the stripe rows 41, and data lengths 506 of data recorded in the entries 42. In a case where the data reduction processing is carried out by the accelerator 14, the data lengths 506 indicate data lengths of the data having undergone the data reduction processing.

FIG. 6 illustrates an extent configuration management table that is the management information for management of configurations of the extents 40. The extent configuration management table 510 illustrated in FIG. 6 includes extent IDs 511, RAID configurations 512 of the extents 40 identified by the extent IDs 511, entry IDs 513 for identification of the entries 42 included in the extents 40, attributes 514 of the entries 42, SSDIDs 515 for identification of the SSDs 20 corresponding to the entries 42, and SSD block IDs 516 for identification of the SSD blocks 21 corresponding to the entries 42.

The attributes 514 of the entries 42 each have any of "Data" indicating the data area, "Parity" indicating the parity area, "Spare" indicating the spare area, and "Unused" indicating an unused state, as a value. In a case where a plurality of types of the redundant data exist, the attributes may further indicate the types. In a case where two types of the redundant data that are P-parity data and Q-parity data exist, for instance, the attributes 514 may include "P-Parity" indicating P-parity area corresponding to the P-parity data and "Q-Parity" indicating Q-parity area corresponding to the Q-parity data, as the values.

FIG. 7 illustrates an extent state management table that is the management information for management of states of the extents 40. The extent state management table 520 illustrated in FIG. 7 includes extent IDs 521, RAID configurations 522 of the extents 40 identified by the extent IDs 521, states 523 of the extents 40, next entry IDs 524 for identification of the entry 42 in which next data is stored, offsets 525 each of which is an offset value from the first logical address of the entry 42 in which the data is to be subsequently stored, and data distribution states 526 indicating distribution states of the data.

The states 523 of the extents 40 each have any of "OPEN" indicating an open state in which data may be stored, "CLOSE" indicating a close state in which storage of data has been completed, and "EMPTY" indicating an empty state in which storage of data has not been started. The data distribution states 526 each have any of "N/A" in which the extent 40 is not used, "BEFORE DISTRIBUTION" indicating a state before the distribution that is the first-order distribution (before the addition to the SSDs 20), "FIRST ORDER" indicating the first-order distribution state in which the first-order distribution has been carried out, and "SECOND ORDER" indicating the second-order distribution state in which the second-order distribution has been carried out.

FIG. 8 illustrates a PG management table that is the management information for management of the parity group PG. The PG management table 530 illustrated in FIG. 8 indicates PGIDs 531 for identification of the parity groups PGs, SSDIDs 532 for identification of the SSDs 20 included in the parity groups PGs, and data distribution states 533 that are states of the parity groups PGs. The data distribution states 533 each have any of "BEFORE DISTRIBUTION" indicating a state before the distribution, "FIRST ORDER" indicating the first-order distribution state, and "SECOND ORDER" indicating the second-order distribution state.

FIG. 9 illustrates an SSD block management table that is the management information for management of the SSD blocks 21. The SSD block management table 540 illustrated in FIG. 9 includes SSDIDs 541, SSD block IDs 542 for identification of the SSD blocks 21 included in the SSDs 20 identified by the SSDIDs 541, states 543 of the SSD blocks 21, extent IDs 544 for identification of the extents 40 corresponding to the SSD blocks 21, and entry IDs 545 for identification of the entries 42 corresponding to the SSD blocks 21. The states 543 of the SSD blocks 21 each indicate either "ASSIGNED" representing existence of the corresponding extent 40 (entry 42) or "UNASSIGNED" representing nonexistence of the corresponding extent 40 (entry 42).

FIG. 10 illustrates a life statistics table that is the management information for management of the lives of the SSDs 20. The life statistics table 550 illustrated in FIG. 10 includes SSD IDs 551, duration of use 552 representing time having elapsed from operation start time of the SSDs 20 identified by the SSD IDs 551, data storage ratios 553 each representing a maximum value of the storage ratios of the SSD 20 in the duration of use 552, remaining lives 554 of the SSDs 20, data volumes 555 of data to be written into the SSDs 20 in the duration of use 552, actual amounts of writing 556 that are volumes of data written actually into the SSDs 20 in the duration of use 552, and life consumption rates 557 indicating rates of decrease in the remaining lives 554 (rates of consumption of the remaining lives 554). The storage controller 10 calculates or measures the values 553 through 557 included in the life statistics table 550 for each specified period and sequentially adds the values to the life statistics table 550.

The remaining lives 554 have an initial value of 100% and the remaining life 554 that marks 0% indicates that the life of the SSD 20 has been exhausted. The remaining lives 554 are each calculated in accordance with an integrated value of the actual amount of writing 556, for instance. The life consumption rates 557 are each calculated as (actual amount of writing 556)/(data volume 555), for instance.

Figure 11:
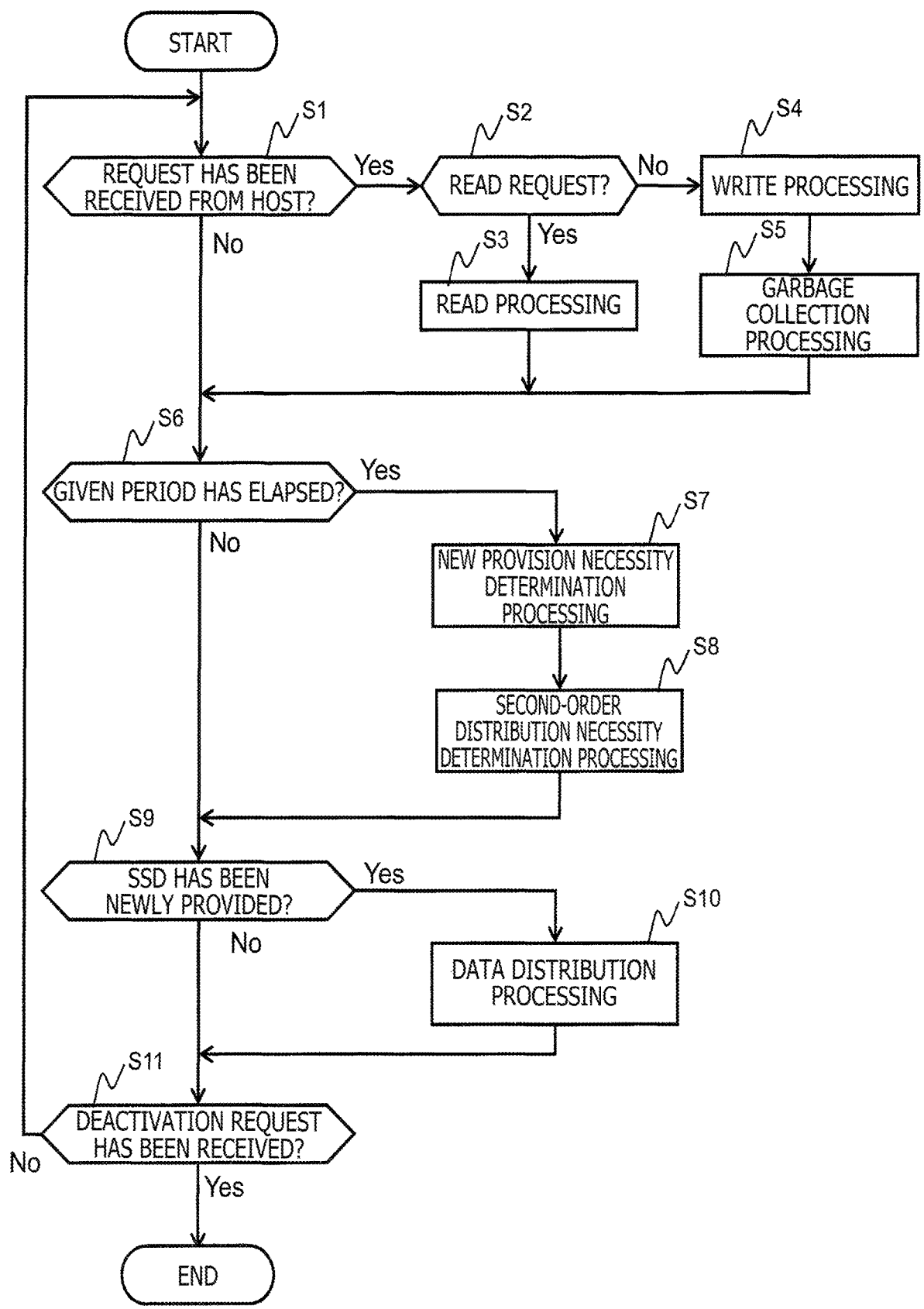
FIG. 11 is a flow chart for description of an example of actions of a computer system.

FIG. 11 is a flow chart for description of an example of actions of the storage controller 10. In the actions below, the RAID configuration before the addition to the SSDs 20 is 2D+1P+1S.

The storage controller 10 determines whether any request from the host devices 2 has been received at the host I/F 11 or not (step S1). If any request has been received, the storage controller 10 determines whether the request is a read request or not (step S2). If the request is a read request, the storage controller 10 carries out read processing including reading data from an SSD 20 based on the read request and transmitting the read data to the host device 2 (step S3). If the request is not a read request, by contrast, the storage controller 10 determines that the request is a write request and carries out write processing (see FIG. 12) including writing data into an SSD 20 based on the write request (step S4). Subsequently, the storage controller 10 carries out garbage collection processing (see FIG. 14) including liberating a storage area having become unnecessary (step S5).

When any request has not been received in step S1, if step S3 has been ended, or if step S5 has been ended, the storage controller 10 determines whether a given period has elapsed or not (step S6). A start time when measurement of the given period is started is an operation start time for the storage device 1 or the time of last determination of the elapse of the given period.

If it is determined in step S6 that the given period has elapsed, the storage controller 10 carries out new provision necessity determination processing (see FIG. 15) including determining whether any SSD 20 is to be newly provided or not (step S7). Subsequently, the storage controller 10 carries out second-order distribution necessity determination processing including determining whether the second-order distribution is to be carried out or not (step S8). The storage controller 10 checks the extent state management table 520 and determines whether the second-order distribution is to be carried out or not, based on the data distribution state 526 of the extent 40, for instance. More specifically, the storage controller 10 determines whether the data distribution state 526 indicating "SECOND ORDER" exists or not, that is, whether any extent 40 indicating the second-order distribution state exists or not. The storage controller 10 determines that the second-order distribution is to be carried out if any extent 40 indicating the second-order distribution state exists, or determines that the second-order distribution is not to be carried out if any extent 40 indicating the second-order distribution state does not exist. If it is determined that the second-order distribution is to be carried out, the storage controller 10 carries out the second-order distribution.

If it is determined in step S6 that the given period has not elapsed, or if step S8 has been ended, the storage controller 10 determines whether any SSD 20 has been added or not (step S9). Then the storage controller 10 may detect whether any SSD 20 has been added or not to a rack (not illustrated) loaded with the SSDs 20 or may check whether information that any SSD 20 has been added has been received or not from the management host device 3. If any SSD 20 has been added, the storage controller 10 carries out the first data distribution processing (see FIG. 16) including moving the data stored in the existing SSDs 20a to the added SSD 20b (step S10).

If any SSD 20 has not been added in step S8 or if step S9 has been ended, the storage controller 10 determines whether any deactivation request for deactivating the storage device 1 has been received or not at the management I/F 12 from the management host device 3 (step S11). The storage controller 10 returns to the processing of step S1 if any deactivation request has not been received, or ends the processing if any deactivation request has been received.

Figure 12:
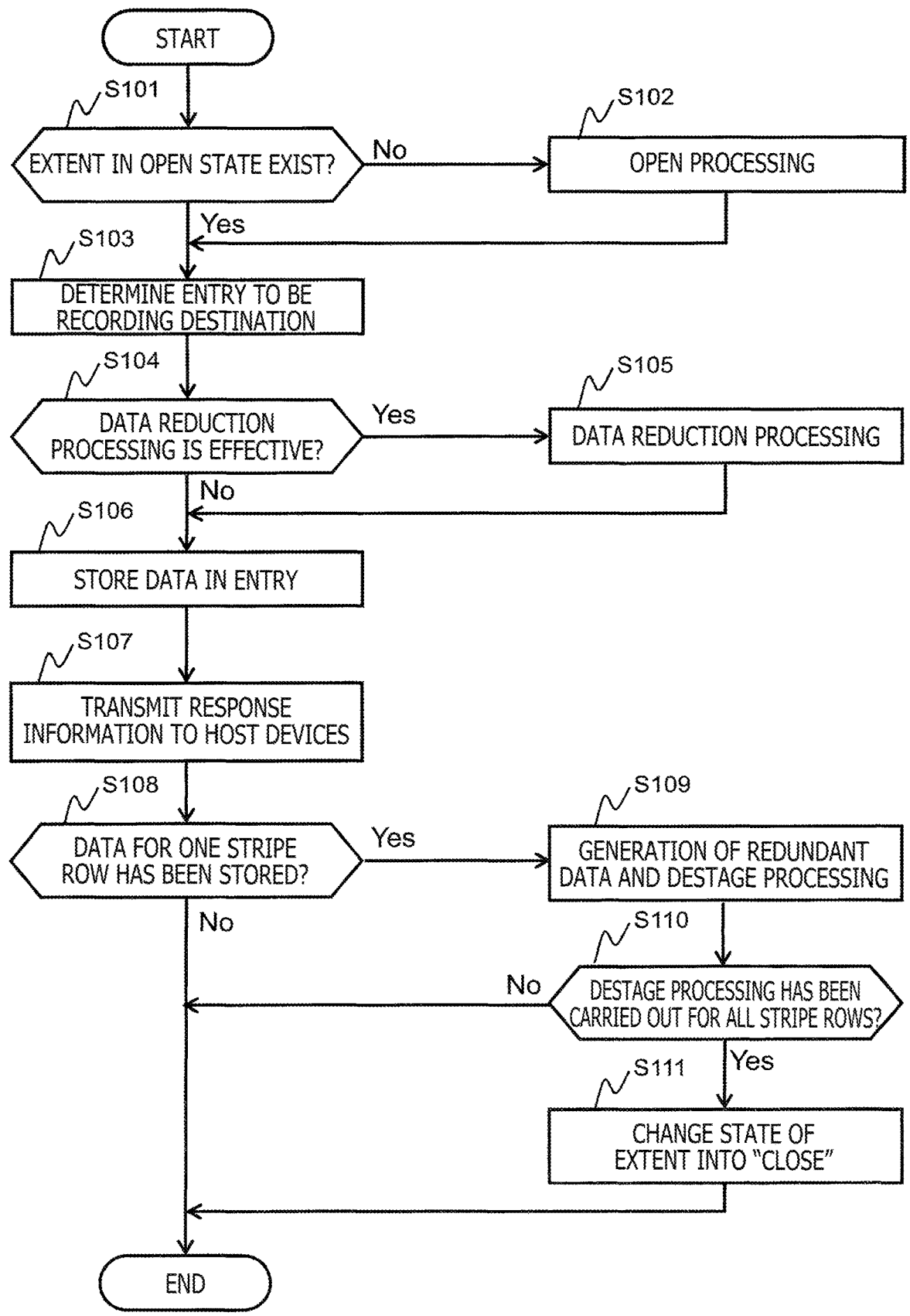
FIG. 12 is a flow chart for description of an example of write processing.

FIG. 12 is a flow chart for description of an example of the write processing of step S4 in FIG. 11.

In the write processing, the storage controller 10 checks the states 523 of the extents 40 in the extent state management table 520 and determines whether any extent 40 in the open state exists or not (step S101). Specifically, the storage controller 10 checks whether any state 523 indicating "OPEN" exists or not. The storage controller 10 determines that any extent 40 in the open state exists if any state 523 indicating "OPEN" exists, or determines that any extent 40 in the open state does not exist if any state 523 indicating "OPEN" does not exist.

If any extent 40 in the open state does not exist, the storage controller 10 carries out open processing (see FIG. 13) including changing any of the extents 40 into the open state (step S102).

If any extent 40 in the open state exists in step S101 or if step S102 has been ended, the storage controller 10 determines an entry 42 to be a recording destination (addition destination) of data, based on the next entry ID 524 and the offset 525 that correspond to the extent ID of the extent 40 in the open state in the extent state management table 520 (step S103).

The storage controller 10 determines whether the data reduction processing by the accelerator 14 is effective or not (step S104). For instance, information indicating whether the data reduction processing is effective or not is recorded in advance in the memory 16 and the storage controller 10 determines whether the data reduction processing is effective or not, based on the information. Whether the data reduction processing is effective or not may differ among the parity groups PG. In this case, the information indicating whether the data reduction processing is effective or not may be added to the PG management table 530.

If the data reduction processing is effective in step S104, the storage controller 10 carries out the data reduction processing for the user data indicated by the write request from the host device 2, by using the accelerator 14 (step S105).

If the data reduction processing is not effective in step S104 or if step S105 has been ended, the storage controller 10 records the user data indicated by the write request, in the recording destination entry 42 determined in step S103, and accordingly updates the virtual volume management table 500 (step S106). If data has been recorded in the recording destination entry 42 in the last and former write processing, the user data is added to the entry 42. If the data reduction processing has been carried out in step S105, the storage controller 10 stores the data having undergone the data reduction processing. The storage controller 10 may carry out duplication processing for data or the like in order to improve reliability.

The storage controller 10 transmits response information indicating that the data has been stored, to the host devices 2 (step S107). Then the storage controller 10 determines whether the user data for one stripe row 41 has been recorded or not (step S108).

If the user data for one stripe row 41 has not been recorded, the storage controller 10 ends the processing. If the user data for one stripe row 41 has been recorded, by contrast, the storage controller 10 generates the redundant data from the user data for one stripe row 41 and carries out destage processing including storing the user data and the redundant data in the SSD 20 (step S109). In the destage processing, the storage controller 10 records the redundant data in the entry 42 having the attribute 514 of the parity area in the stripe row 41 in which the user data is recorded, for instance. The storage controller 10 stores the data recorded in each entry 42 in the relevant stripe row 41, in the SSD block 21 identified by the SSD ID 515 and the SSD block ID 516 that correspond to the entry ID 513 for identification of the entry 42, based on the extent configuration management table 510.

The storage controller 10 determines whether the destage processing has been carried out for all the stripe rows 41 in the extent 40 or not (step S110). If the destage processing has not been carried out for all the stripe rows 41, the storage controller 10 ends the processing. If the destage processing has been carried out for all the stripe rows 41, by contrast, the storage controller 10 changes the state 523 of the relevant extent 40 in the extent state management table 520 into "CLOSE" (step S111) and ends the processing.

Figure 13:
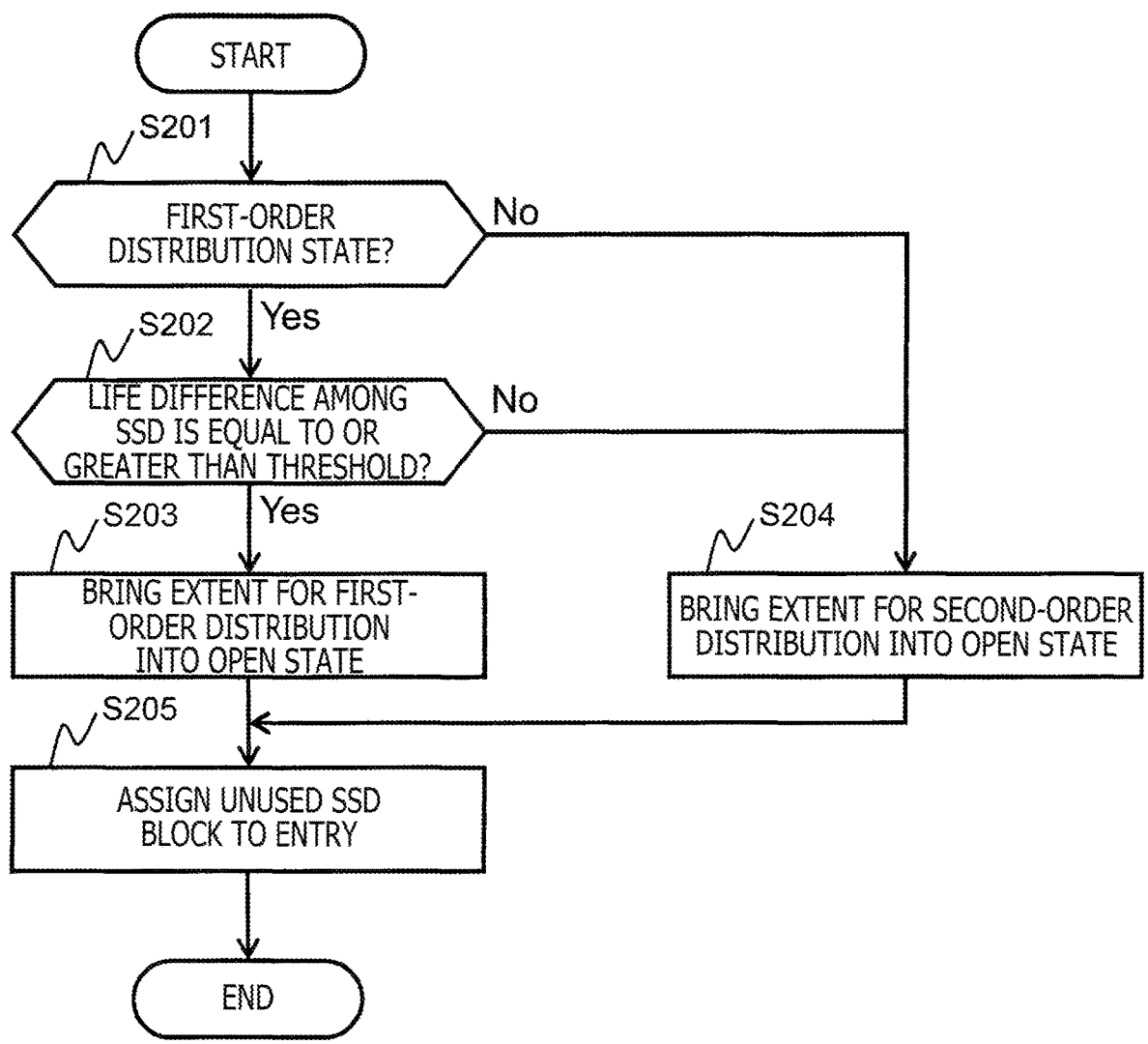
FIG. 13 is a flow chart for description of an example of open processing.

FIG. 13 is a flow chart for description of an example of the open processing of step S102 in FIG. 12.

The storage controller 10 checks the PG management table 530 and determines whether the data distribution state of the parity groups PG to be a storage destination of data is the first-order distribution state or not, that is, whether the data distribution state 533 indicates "FIRST ORDER" or not (step S201).

If the data distribution state 533 indicates "FIRST ORDER," that is, if the parity group PG is in the first-order distribution state, the storage controller 10 calculates the life difference among the SSDs 20 included in the parity group PG on the basis of the life statistics table 550 and determines whether the life difference is equal to or greater than the threshold or not (step S202). Specifically, the life difference is a value resulting from subtraction of a value based on the remaining lives 554 of the existing SSDs 20a from the remaining life 554 of the added SSD 20b. The value based on the remaining lives 554 may be a statistic of the remaining lives 554 of the existing SSDs 20a or may be the remaining life 554 of an SSDa selected from among the existing SSDs 20a by a specified method. The statistic is an average value, maximum value, minimum value, or the like, for instance. The threshold is approximately between 20% and 30%, for instance.

If the life difference is equal to or greater than the threshold, the storage controller 10 creates an extent 40 for the first-order distribution and brings the extent 40 into the open state (step S203). For instance, the storage controller 10 selects one extent ID 521 corresponding to the state 523 indicating "EMPTY" from the extent state management table 520. The storage controller 10 brings the RAID configuration 522, the state 523, and the data distribution state 526 that correspond to the selected extent ID 521, into "2D+1P+1S," "OPEN," and "FIRST ORDER," respectively. In the extent configuration management table 510, the storage controller 10 brings the RAID configuration 512 corresponding to the same extent ID 511 as the selected extent ID 521, into "2D+1P+1S" and appropriately assigns the attributes 514 to the entry IDs 513 corresponding to the extent ID 511.

If the data distribution state 533 does not indicate "FIRST ORDER" in step S201 or if the life difference is smaller than the threshold in step S202, the storage controller 10 creates an extent 40 for the second-order distribution and brings the extent 40 into the open state (step S204). For instance, the storage controller 10 selects one extent ID 521 corresponding to the state 523 indicating "EMPTY" from the extent state management table 520. The storage controller 10 brings the RAID configuration 522, the state 523, and the data distribution state 526 that correspond to the selected extent ID 521, into "3D+1P+1S," "OPEN," and "SECOND ORDER," respectively. In the extent configuration management table 510, the storage controller 10 brings the RAID configuration 512 corresponding to the same extent ID 511 as the selected extent ID 521, into "3D+1P+1S" and assigns an attribute 514 to each of the entry IDs 513 corresponding to the extent ID 511.

If step S203 or step S204 has been ended, the storage controller 10 assigns unused SSD blocks 21 to entry IDs 513 in the created extent 40 (extent brought into the open state) and updates the SSD IDs 515 and the SSD block IDs 516 in the extent configuration management table 510 (step S205) and then ends the processing.

If the data distribution state 526 in the extent state management table 520 becomes "SECOND ORDER" in step S204, it is determined in step S8 of FIG. 11 that any extent 40 indicating the second-order distribution state exists and the second-order distribution is carried out. Therefore, the second-order distribution is carried out on condition that the life difference is smaller than the threshold. In the second data distribution processing, the number of pieces of the data in the parity group that is stored before the start of the second data distribution processing is not changed but the number of pieces of the data in the parity group that is stored after the start of the second data distribution processing is changed from the number of pieces of the data before the start of the second data distribution processing.

Figure 14:
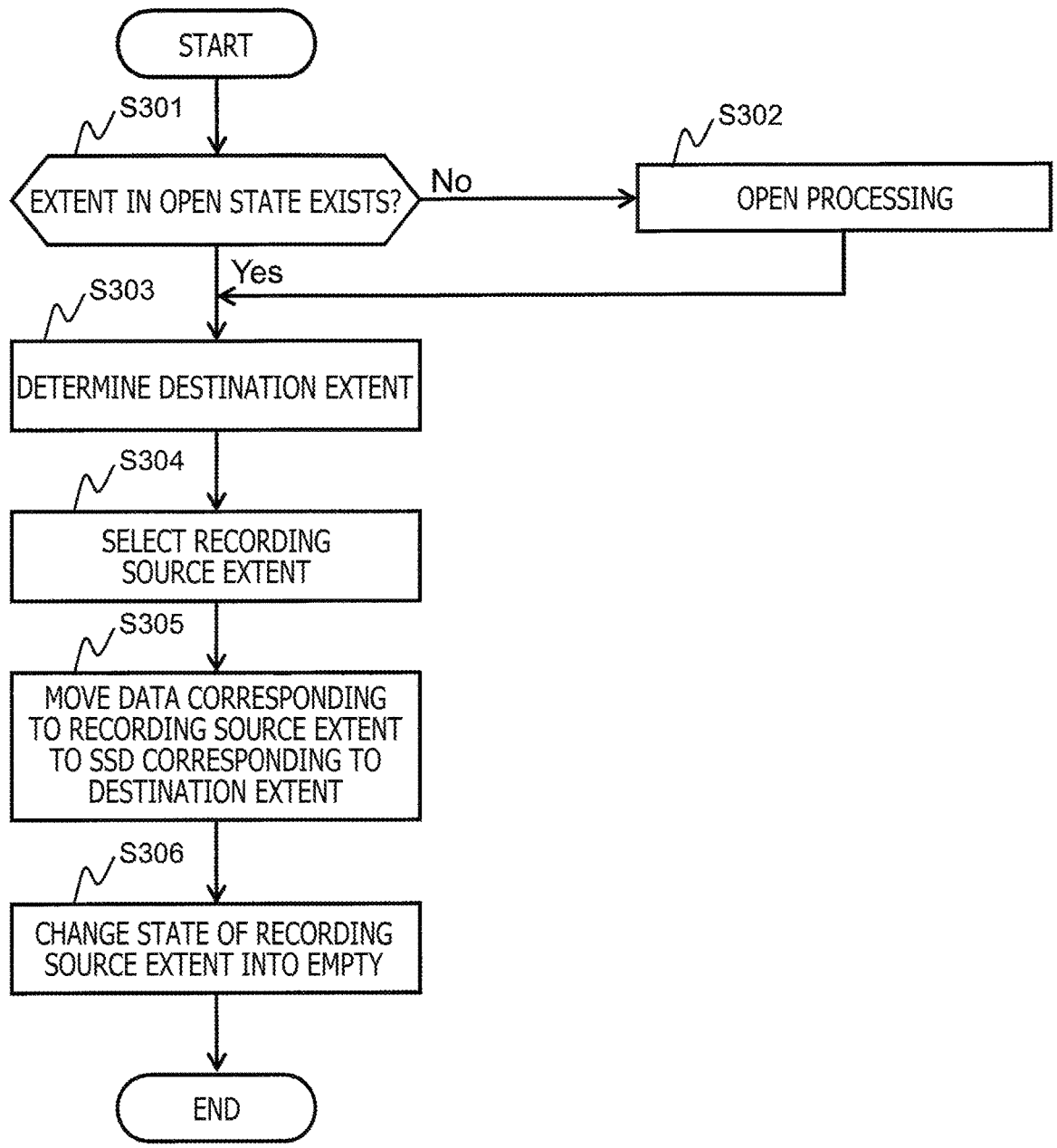
FIG. 14 is a flow chart for description of an example of garbage collection processing.

FIG. 14 is a flow chart for description of an example of the garbage collection processing of step S5 in FIG. 11.

In the garbage collection processing, the storage controller 10 checks the states 523 of the extents 40 in the extent state management table 520 and determines whether any extent 40 in the open state exists or not (step S301). If any extent 40 in the open state does not exist, the storage controller 10 carries out the open processing including changing any of the extents 40 into the open state (step S302). The open processing of step S302 is similar to the open processing described with use of FIG. 13.

If any extent 40 in the open state exists or if step S302 has been ended, the storage controller 10 selects the extent 40 in the open state as a destination extent for data (step S303).

The storage controller 10 selects a source extent 40 (step S304). For instance, the storage controller 10 selects an extent 40 that is the most deficient in effective data. The effective data refers to data stored in the SSD blocks corresponding to the entries 42 in extent 40.

The storage controller 10 moves the effective data in the SSDs 20 corresponding to the source extent 40 selected in step S304 into the SSD blocks 21 corresponding to the destination extent 40 selected in step S303 (step S305). Then the storage controller 10 changes the state 523 of the source extent 40 in the extent state management table 520 into "EMPTY" (step S306) and ends the processing.

Figure 15:
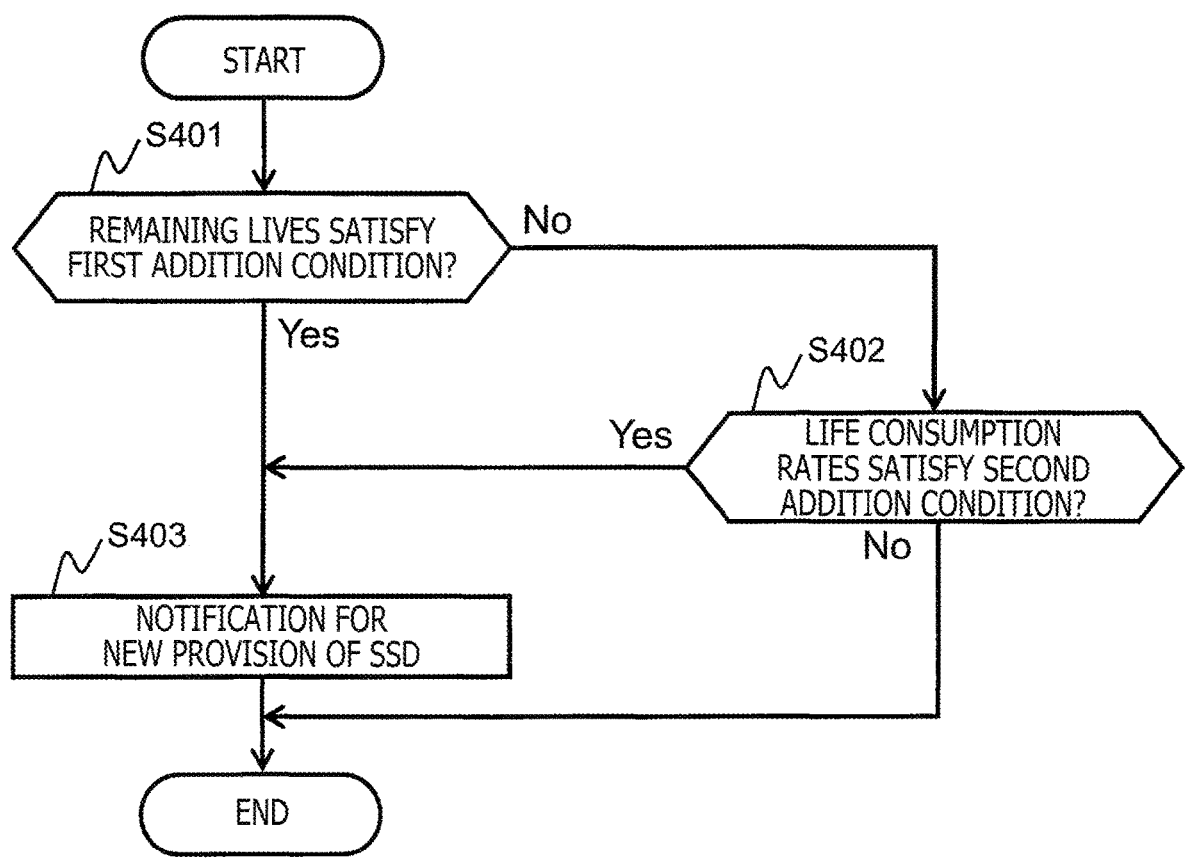
FIG. 15 is a flow chart for description of an example of new provision necessity determination processing.

FIG. 15 is a flow chart for description of an example of the new provision necessity determination processing of step S7 in FIG. 11.

In the new provision necessity determination processing, the storage controller 10 checks the life statistics table 550 and determines whether the remaining lives 554 of the SSDs 20 included in each parity group PG satisfy a first addition condition or not (step S401). For instance, the storage controller 10 determines whether the statistic of the remaining lives 554 of the SSDs 20 included in the parity group PG is equal to or greater than a life threshold or not. In this case, the storage controller 10 determines that the remaining lives 554 satisfy the first addition condition if the statistic of the remaining lives 554 is smaller than the life threshold, or determines that the remaining lives 554 do not satisfy the first addition condition if the statistic of the remaining lives 554 is equal to or greater than the life threshold. The life threshold is 30%, for instance.

If the remaining lives 554 do not satisfy the first addition condition, the storage controller 10 determines whether the life consumption rates 557 of the SSDs 20 included in each parity group PG satisfy a second addition condition or not (step S402). For instance, the storage controller 10 determines whether a statistic of the life consumption rates 557 of the SSDs 20 included in the parity group PG is equal to or greater than a rate threshold or not. In this case, the storage controller 10 determines that the life consumption rates 557 satisfy the second addition condition if the statistic of the life consumption rates 557 is smaller than the rate threshold, or determines that the life consumption rates 557 do not satisfy the second addition condition if the statistic of the life consumption rates 557 is equal to or greater than the rate threshold. The rate threshold is three, for instance.

If the life consumption rates 557 do not satisfy the second addition condition, the storage controller 10 ends the processing. If the remaining lives 554 satisfy the first addition condition or if the life consumption rates 557 satisfy the second addition condition, by contrast, the storage controller 10 transmits notification information requesting addition to the SSDs 20, to the management host device 3 (step S403) and ends the processing.

Figure 16:
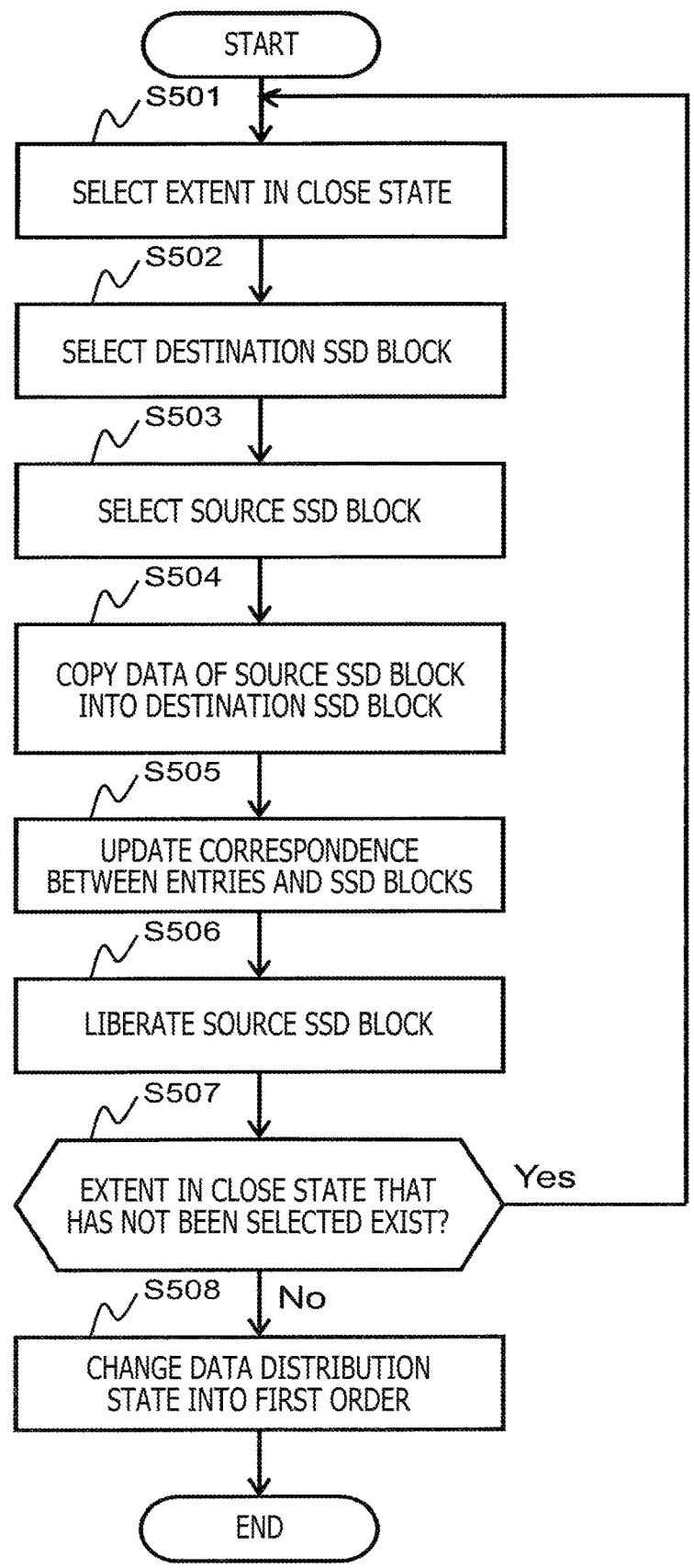
FIG. 16 is a flow chart for description of an example of first data distribution processing.

FIG. 16 is a flow chart for description of an example of the first data distribution processing of step S10 in FIG. 11.

The storage controller 10 checks the states 523 of the extents 40 in the extent state management table 520 and selects an extent 40 in the state 523 indicating "CLOSE," that is, the extent 40 in the close state (step S501). The storage controller 10 selects the SSD blocks 21 of the added SSD 20b as destinations of data (step S502). The storage controller 10 selects the SSD blocks corresponding to the entries in the selected extent 40 as sources of the data (step S503).

The storage controller 10 copies the data stored in the source SSD blocks 21 into the destination SSD blocks 21 (step S504). The storage controller 10 updates correspondence relationships between the entries 42 and the SSD blocks 21 in the extent configuration management table 510 and the SSD block management table 540 (step S505). The storage controller 10 liberates the source SSD blocks 21 (step S506). The source SSD blocks 21 are liberated by issuance of unmap commands for cancellation of the correspondence relationships between the SSD blocks 21 and the entries 42 to the SSDs 20 or the like, for instance.

The storage controller 10 checks whether any extent 40 in the close state that has not been selected in step S501 exists or not (step S507). If the extent 40 that has not been selected exists, the storage controller 10 returns to processing of step S501. In the processing of step S501, the storage controller 10 selects the extent 40 in the close state from among the extents 40 that have not yet been selected.

If the extent 40 that has not been selected does not exist, the storage controller 10 changes the data distribution state 533 in the PG management table 530 into "FIRST ORDER" (step S508) and ends the processing.

In the first data distribution processing, the storage controller 10 may determine moved data volume for movement from each existing SSD to the added SSD, based on the life of the existing SSD, and may move the user data by the moved data volume.

As described above, the present disclosure includes following particulars.

The storage device (1) according to one aspect of the present disclosure includes the control unit (10) and the plurality of memory devices (20). The parity group is configured by including the first number of pieces of the user data and the redundant data generated from the first number of pieces of the user data. The user data and the redundant data in the parity group are stored in different memory devices. In a case where any new memory device is added to the storage device, the control unit carries out the first data distribution processing including moving any piece of the user data in the parity group from the existing memory devices to the added memory device and the second data distribution processing including increasing the number of pieces of the user data configuring the parity group from the first number to the second number after the first data distribution processing and storing the user data in the plurality of memory devices.

Upon addition to the memory devices, above configurations enable the distribution of the data among the existing memory devices and the added memory device without restructuring of the data and thus make it possible to carry out the distribution of the data to the added memory device in a short period of time.

The memory devices have the lives based on the amounts of writing and the control unit determines the moved data volume for the movement from each of the existing memory devices to the added memory device, based on the life of the existing memory device in the first data distribution processing. Thus, the remaining lives of the existing devices may be leveled.

The control unit determines the timing of the start of the second data distribution processing, based on the life difference among the memory devices. Thus, the remaining lives of the existing devices and the added device may be leveled.

In the second data distribution processing, the data volume of the redundant data with respect to the user data is decreased. Thus, the overall data volume may be reduced, so that the lives of the memory devices may be extended.

The data is stored in a log structure scheme. In the second data distribution processing, the control unit does not change the number of pieces of the data in the parity group that is stored before the start of the second data distribution processing but changes the number of pieces of the data in the parity group that is stored after the start of the second data distribution processing, to the second number. Thus, distribution control that is suitable for the log structure scheme is enabled.

The control unit calculates the life difference resulting from the subtraction of the remaining life of existing devices that are the existing memory devices from the remaining life of an added device that is the added memory device and, if the life difference is smaller than the threshold, newly distributes and stores the data stored in the existing devices and the added device, among and in existing devices that are larger in number than the existing devices and the added device, by a second data unit greater than a first data unit each time. On condition that the life difference is thereby made smaller than the threshold, the capacity usage rates of the existing devices and the capacity usage rate of the added device may be leveled, so that the remaining lives of the existing devices and the added device may be leveled.

The above-described embodiment of the present disclosure is an example for description of the disclosure and is not intended to limit the scope of the disclosure to the embodiment. Those skilled in the art may implement the present disclosure in other various manners without departing from the scope of the disclosure.

What is claimed is:

1. A storage device comprising a control unit and a plurality of memory devices, wherein
    a parity group is defined by a first configuration including
        a first number of pieces of user data and redundant data generated from the first number of pieces of the user data,
    the user data and the redundant data in the parity group are stored in the different memory devices from each other,
    in a case where any new memory device is added to the storage device, the control unit carries out
        first data distribution processing moving any piece of the user data in the parity group from the existing memory devices to the added memory device, and
        second data distribution processing increasing the number of pieces of the user data which define the first configuration of the parity group from the first number to a resultant second number, wherein the presence of the second number of pieces of the user data define a second configuration, after the first data distribution processing, and storing the resultant user data in the plurality of memory devices, and
    when the control unit calculates a life difference resulting from subtraction of a remaining life of existing devices that are the existing memory devices from a remaining life of an added device that is the added memory device and receives a write request for data,
        if the life difference is equal to or greater than the threshold, the control unit distributes and stores the data, by a first data unit, among and in same number of memory devices as the number of the existing devices selected from the existing devices and the added device, and
        if the life difference is smaller than the threshold, the control unit newly distributes and stores the data, by a second data unit greater than the first data unit, among and in larger number of the existing devices and the added device than the number of the existing devices.

2. The storage device according to claim 1, wherein
    the lives of the existing and added memory devices are based on amounts of writing, and
    the control unit determines a moved data volume for movement from each of the existing memory devices to the added memory device, based on the life of the existing memory device, in the first data distribution processing.

3. The storage device according to claim 2, wherein the control unit determines timing of start of the second data distribution processing, based on the life difference among the memory devices.

4. The storage device according to claim 1, wherein a data volume of the redundant data with respect to the user data is decreased in the second data distribution processing.

5. The storage device according to claim 1, wherein the data is stored in a log structure scheme, and
in the second data distribution processing, the control unit does not change the number of pieces of the data in the parity group that is stored before starting the second data distribution processing but changes the number of pieces of the data in the parity group, the number of pieces of the data being stored after starting the second data distribution processing, to the second number.

6. A storage management method executed by a storage device including a plurality of memory devices,
a parity group being defined by a first configuration including a first number of pieces of user data and redundant data generated from the first number of pieces of the user data,
the user data and the redundant data in the parity group being stored in the different memory devices from each other,
in a case where any new memory device being added to the storage device, the method comprising:
first data distribution processing moving any piece of the user data in the parity group from the existing memory devices to the added memory device, and
second data distribution processing increasing the number of pieces of the user data which define the first configuration of the parity group from the first number to a resultant second number, wherein the presence of the second number of pieces of the user data define a second configuration after the first data distribution processing, and storing the resultant user data in the plurality of memory devices, and
when the control unit calculates a life difference resulting from subtraction of a remaining life of existing devices that are the existing memory devices from a remaining life of an added device that is the added memory device and receives a write request for data,
if the life difference is equal to or greater than the threshold, the control unit distributes and stores the data, by a first data unit, among and in same number of memory devices as the number of the existing devices selected from the existing devices and the added device, and
if the life difference is smaller than the threshold, the control unit newly distributes and stores the data, by a second data unit greater than the first data unit, among and in larger number of the existing devices and the added device than the number of the existing devices.

* * * * *